United States Patent [19]
Holzapfel et al.

[11] Patent Number: 5,977,539
[45] Date of Patent: Nov. 2, 1999

[54] OPTICAL POSITION-MEASURING DEVICE HAVING REFERENCE MARK GRADUATION STRUCTURES WITH CHIRP FIELDS

[75] Inventors: Wolfgang Holzapfel, Obing; Erwin Spanner, Traunstein, both of Germany

[73] Assignee: Dr. Johannes Heidenhain GmbH, Traunreut, Germany

[21] Appl. No.: 08/974,765

[22] Filed: Nov. 20, 1997

[30] Foreign Application Priority Data

Nov. 20, 1996 [DE] Germany .................. 196 48 018

[51] Int. Cl.⁶ ........................................... H01J 3/14
[52] U.S. Cl. ........................ 250/237 G; 250/231.14; 250/559.29; 356/356
[58] Field of Search .................... 250/237 G, 231.13, 250/231.14, 559.29, 559.32; 356/356, 374

[56] References Cited

U.S. PATENT DOCUMENTS

| | | | |
|---|---|---|---|
| 4,776,701 | 10/1988 | Pettigrew | 356/356 |
| 5,079,418 | 1/1992 | Michel et al. | 250/237 G |
| 5,428,445 | 6/1995 | Holzapfel | 356/356 |
| 5,648,658 | 7/1997 | Holzapfel et al. | 250/237 G |

FOREIGN PATENT DOCUMENTS

| | | |
|---|---|---|
| 0 163 362 | 6/1988 | European Pat. Off. . |
| 0513 427 | 5/1991 | European Pat. Off. . |
| 39 05 730 | 8/1989 | Germany . |

*Primary Examiner*—Que T. Le
*Attorney, Agent, or Firm*—Brinks Hofer Gilson & Lione

[57] ABSTRACT

A position-measuring device for the determination of the relative position of two objects movable with respect to one another includes at least two graduation carriers connected to the movable objects on each of which, formed as chirp fields, are disposed reference mark graduation structures that serve to generate a defined signal at a known absolute position. From the scanning chirp field assigned to the scanning graduation carrier, the incident beams of a light source disposed on the illumination side and separable into at least two individual beams of differing orders of diffraction that strike at spatially separated scale chirp fields.

16 Claims, 7 Drawing Sheets

OPTICAL POSITION-MEASURING DEVICE HAVING REFERENCE MARK GRADUATION STRUCTURES WITH CHIRP FIELDS

BACKGROUND OF THE INVENTION

1. Field of the Invention

The present invention is directed to a position-measuring device, and more particularly, a position-measuring device that generates a high-resolution reference pulse signal.

2. Discussion of Relevant Art

In prior-art optical position-measuring devices, a scale having both an incremental track and a reference track are provided to allow absolute positions to be determined. In order to generate an accurate absolute position the reference marks in the reference track should have as high a resolution as the incremental marks in the incremental track. Consequently it is desired, particularly for high-resolution interferential position-measuring devices, to have as narrow as possible a reference pulse. It is not possible, however, to provide such high resolution using traditional, non-interferential methods for the generation of reference pulse signals. U.S. Pat. No. 5,428,445 discloses employing so-called chirped grid graduation structures to generate high-resolution reference pulse signals in interferential measuring systems. The graduation structures needed for this have location-dependent, continuously increasing or continuously decreasing graduation periods. That is, the graduation structures do not have the same graduation period over their entire length. These types of graduation structures from the point of view of development as one proceeds from a complete grid are in turn, divided into a series of smaller subgrids with each subgrid having a constant but different grid constant. Each of the individual subgrids provides, during optical sampling, a defined contribution of differing frequency to the resulting total signal. Due to the superposition of the varying-frequency signal contributions of the different subgrids, a non-periodic signal with a sharp, spatially defined maximum results. By suitable variation of the grid parameters of the chirped grid structures the amplitudes and phase of the different signal contributions and thus the resulting signal can be selectively influenced. In particular a desired high-resolution signal for the reference pulse signal can be selected in this way.

Due to certain design requirements, for example, problems result when a reference pulse signal based on chirped graduation structures is to be generated for large distance between the scale grating and scanning gratings. Thus for large distance between the scale grating and scanning grating, between the chirped graduation structure and the scanning graduation the individual beams split by the scanning unit strike areas on the graduation that lie further removed from one another than is the case for a comparatively small distance between the scale grating and scanning grating. The same effect occurs if, at a given distance between the scale grating and scanning grating, the local graduation period is reduced, as is possibly required for a narrower reference pulse.

While at a smaller distance between the scale grating and scanning grating it can be assumed that the local grid constant of the incident differing graduation areas is approximately identical insofar as the graduation period only changes slowly, this assumption no longer applies in case of an enlarged distance between the scale grating and scanning grating or a reduction of the width of the reference pulse. Rather, at the different points of incidence of the split individual beams, different local grid constants are present.

Moreover, in order to generate an interference signal, the individual beams issuing or splitting off from a point must, however, be combined again approximately at one common point. Hereby the individual beams diffracted in different directions should preferably have run through the same optical path length. This is no longer possible due to the different diffracted effect of the areas of different local grid constants for the various individual beams in the case of large distance between the scale grating and scanning gratings.

One solution may be to provide the scale chirp fields with a very slowly changing graduation period. High-resolution reference signal pulses depend, however, on correspondingly small local grid constants with a large deflecting effect. Thus large-surface sample fields result, which contradicts the requirements for a compact design of the sampling unit.

Along with the requirement for larger distance between the scale grating and scanning gratings, between the scanning and scale graduations a certain insensitivity of the generated reference pulse signals with respect to the so-called Moiré rotations is desirable in high-resolution interferential position-measuring devices. Hereby let Moiré rotation be understood to mean a rotation of the scale and scanning graduations about an axis perpendicular to the scale graduation. Even in the case of a rotation of this type a constant position of the reference pulse signal relative to the incremental signal must be guaranteed.

A particularly adjustment-insensitive optical position-measuring device for the registration of the position of two objects movable relative to one another is known from U.S. Pat. No. 5,079,418. The disclosed position-measuring device operates according to the interferential principle and includes, along with the scanning unit and scale graduations at least one retroreflecting element that, after the initial pass through of the scanning and scale graduations, causes a deflection of the individual beams back in the direction of incidence so that the scanning and scale graduations are passed through again. A particularly adjustment-insensitive measuring arrangement with high resolution is provided due to the retroreflection provided and the repeated passing through of the scanning and scale graduations.

It is thus an object of the present invention to generate as high-resolution reference pulse signals as possible, particularly in an interferential position-measuring device. It is also an object to provide greater distance between the scale grating and scanning gratings between the scanning graduation and the scale graduation in order thereby to achieve a greater flexibility with regard to various design requirements.

SUMMARY OF THE INVENTION

A position-measuring device is provided that allows the production of an absolute reference position using a reference pulse signal with the same high resolution as the determination of the relative position using incremental signals. On the whole an improved precision of measurement for the entire system results.

The arrangement provided according to the invention has at least two separate scale chirp fields with a spatial arrangement of the chirped graduation structures defined for each which makes it possible to scan at greater distance between the scale grating and scanning gratings between the scanning and scale graduations. For this purpose the separate scale chirp fields are disposed or dimensioned in such a manner that the split individual beams that finally lead again to interference strike areas or positions assigned to one another in which at least similar local grid constant are present.

A high adjustment insensitivity for the entire system is moreover provided by the position-measuring device according to the present invention. This then applies not only to the generation of the incremental signals but also to the generated reference pulse signals and to the spatial reference of the various signals to one another. In particular, in the case of a so-called Moiré tilt where a rotation or tilt of a scanning graduation about an axis perpendicular to the scale graduation is to be understood, advantages result from the present invention. Thus, the generated reference pulse signal is thereby not only stable in amplitude but rather retains its positional relation relative to the incremental signals despite the tilt. The reference pulse generated in this way consequently always marks, within coarse design tolerances, the same signal period for the incremental signals. A fine adjustment of the Moiré tilt otherwise required is thus avoided, which once again is of great advantage, in particular, in the case of high-resolution position-measuring device.

Further advantages as well as details of the inventive optical position-measuring device according to the present invention follow from the preferred embodiments below, described with the aid of the accompanying drawings.

DETAILED DESCRIPTION OF THE PRESENTLY PREFERRED EMBODIMENTS

Figure 1:
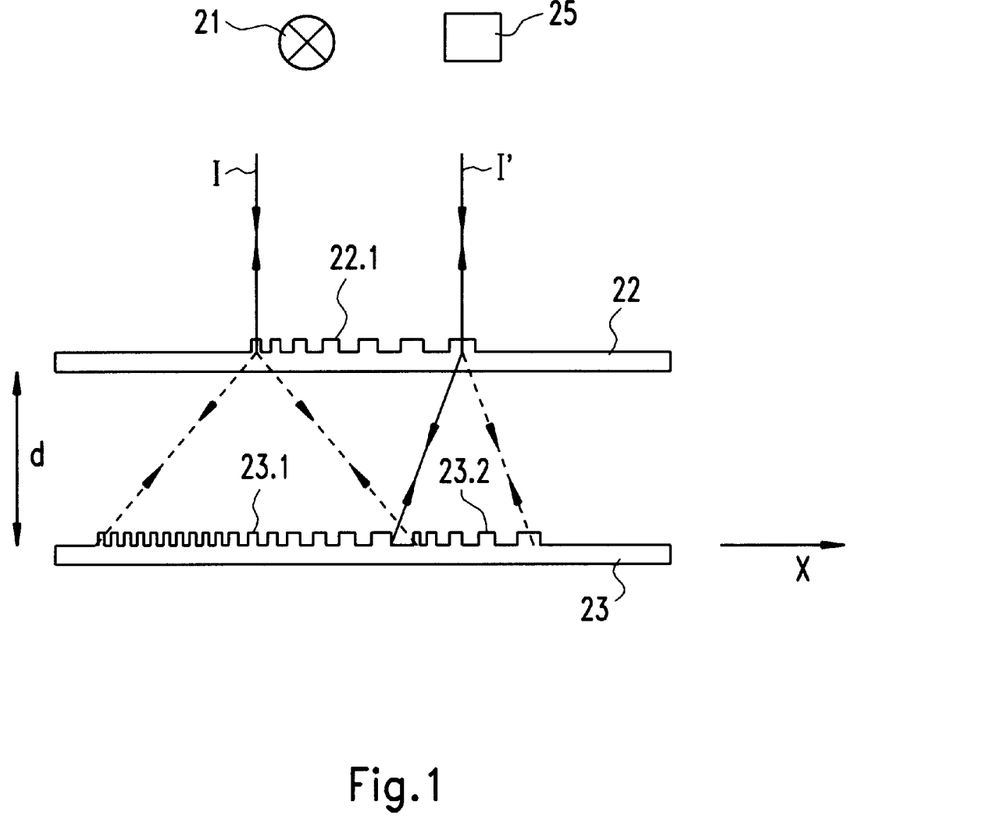
FIG. 1 is a schematic of a portion of a position-measuring device according to a first preferred embodiment of the present invention.
Figure 2:
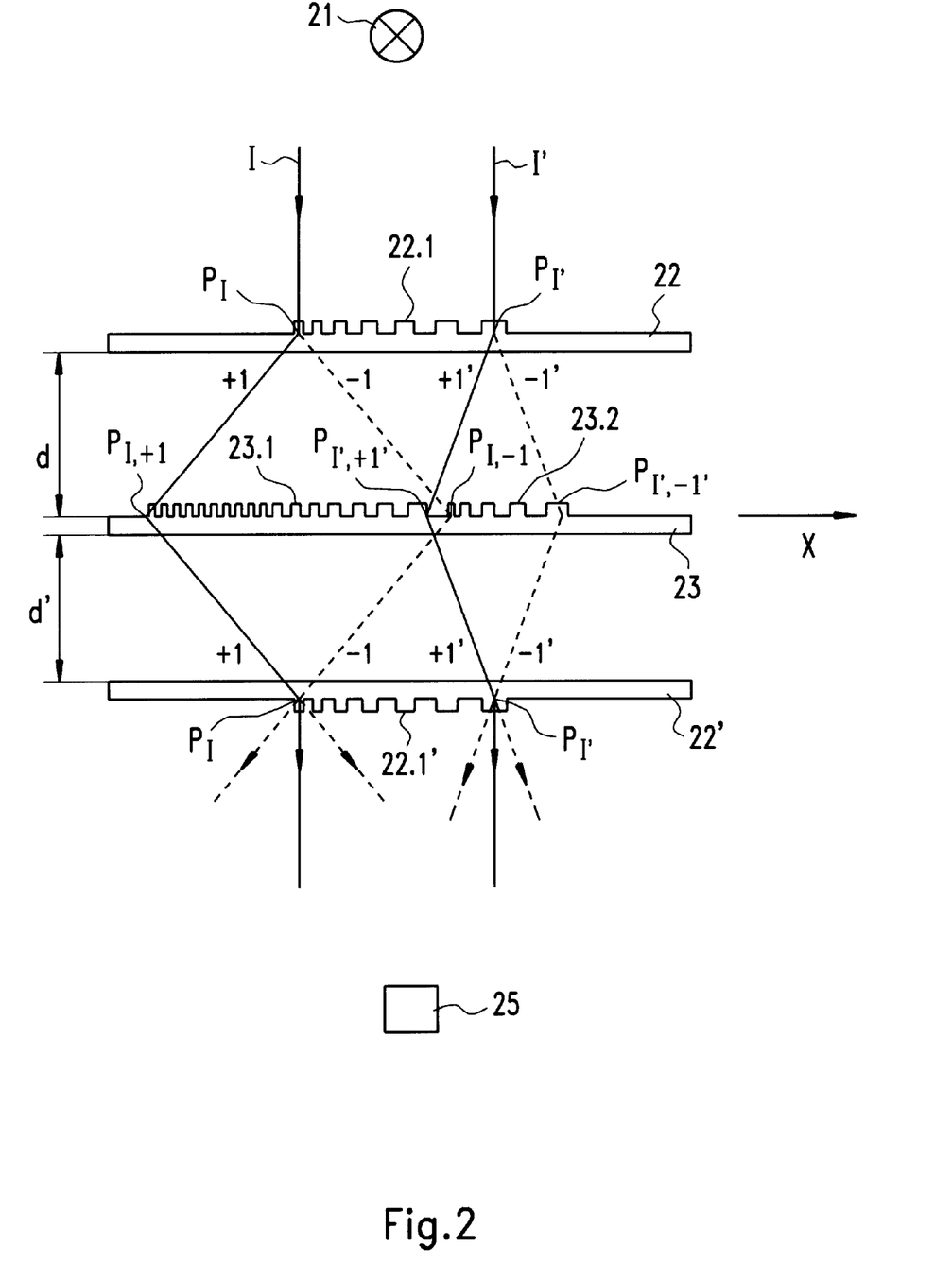
FIG. 2 illustrates beam paths generated by the device shown in FIG. 1.

FIG. 1 is a schematic of a portion of a position-measuring device according to a preferred embodiment of the present invention. FIG. 2 illustrates the beam paths generated by the device shown in FIG. 1. The second graduation carrier 22, 22' shown in FIG. 2 is consequently, with regard to its function, identical to the graduation carrier 22 shown in FIG. 1, which, in reality, is passed through twice by the various beams. FIG. 2 is meant to clearly illustrate the beam paths and thus the scanning graduation carrier 22 of FIG. 1 is shown as two graduations 22, 22' in FIG. 2.

In this preferred embodiment, which generates an interferential reference pulse signal on the basis of prior art triple grid transmitters, the desired greater distance between the scale grating and scanning grating between scanning and scale graduation can be realized where in the case of the incident light arrangement the relation d=d' also applies in FIG. 2. FIGS. 1 and 2 only show that part of the position-measuring device that serves to generate the reference pulse signals. Not recognizable on the other hand is that part of the position-measuring device that is drawn upon for the generation of the incremental signals according to the prior art and, for this purpose, includes scanning and scale graduations each with a constant graduation period. U.S. Pat. No. 4,776,701 discloses this prior art and is specifically incorporated herein by reference The position-measuring device may be used, for example, in machine tools in order to determine the relative position of tool with respect to a workpiece. Moreover numerous other possible uses are conceivable, for example, the position-measuring device may be used to position various elements in semiconductor manufacture and so on. Particularly in the latter application, for purely high-precision positioning, an incremental track can be omitted because no continuous registration of position over a greater area of measurement is needed. Rather the precise knowledge of definite positions suffices for the desired precise relative positioning.

The optical position-measuring device in the preferred embodiment shown in FIG. 1 includes on the illumination side a light source 21, for example, a laser diode. Collimation optics are not shown in FIG. 1 but would be included in the beam path of the light source 21. The light emitted by the light source 21 and collimated arrives first at a transmittive scanning graduation carrier 22 and is deflected at its graduations 22.1 in various spatial directions, for example, as shown a diffraction on the order of +1 and −1 results (see FIG. 2). This, as well as the following short description of the beam path, applies elsewhere as well for the beams that are drawn upon for the generation of the incremental signals as well as for the beam paths that are used for the generation of the reference pulse signals still to be explained in more detail. The individual beams diffracted at the scanning graduation carrier 22 in various orders of diffracted subsequently arrive at a reflectively formed scale graduation carrier 23 that is disposed displaceably in the X-direction relative to the scanning graduation carrier 22. Of course in this as well as in other preferred embodiments, the scanning graduation carrier can also be slidably displaced. All that is required is that there is relative distance between the scale grating and scanning grating of the scale and scanning graduation carriers. As can be seen from the representation in FIG. 2, the scale graduation carrier 23 can, in principle, also be formed transparently instead of reflectively. In such a case two scanning graduation carriers 22, 22' would in fact be needed. Also at the scale graduation carrier 23 or its assigned graduation structures a deflection or diffraction of the incident individual beams in the direction of the scanning graduations carrier 22' (or 22) occurs. The individual beams arriving once again at the scanning graduation 22' finally interfere after the second pass through the scanning graduation 22'. The resulting interference signals are registered on the detector side with one or more optoelectric detector elements 25 and are converted into distance between the scale grating and scanning grating-dependent signals by a subsequently disposed evaluation unit (not shown). The relative distance between the scale grating and scanning grating of the graduation carriers 22, 23 in the direction of measurement X shown causes a definite phase offset between each of the interfering individual beams, which causes at least one detector element 25 to register distance between the scale grating and scanning grating-dependent modulated signals that subsequently are evaluated according to the prior art. Thereby, in the case of the reference pulse signal, a signal is detected that has its maximum amplitude at a defined absolute position subsequently denoted as the zero point.

As already mentioned above FIGS. 1 and 2 show only the area or section of the optical position-measuring device that serves to generate the reference pulse signal. According to the invention the reference mark graduation structures assigned to scanning graduation carrier 22 as well as to the scale graduation 23 are formed as so-called chirp fields. A chirp field is a graduation structure whose grid graduation has a continuous, location-dependent variable graduation period. U.S. Pat. No. 5,428,445, assigned to the present assignee, describes such graduation structures and is hereby incorporated by reference.

To the scanning graduation carrier 22 one scanning chirp field is assigned in the preferred embodiment shown while two scale chirp fields 23.1, 23.2 separated in the X-direction are assigned to the scale graduation carrier 23. The required dimensioning of the scale chirp fields 23.1, 23.2 were drawn in FIGS. 1 and 2 to separate incident individual beams I, I' that strike the scanning chirp field 22.1 at the positions, $P_I$, $P_{I'}$ respectively, at which clearly different local graduation periods for the scanning chirp field 22.1 are present.

In order to guarantee that the beams, I, I', split at a defined point $P_I$, $P_{I'}$ of the scanning chirp field 22.1, can interfere with one another, it must be guaranteed that the individual beams each going out from a common point $P_I$, $P_{I'}$ are recombined at the same point $P_I$, $P_{I'}$ on the second pass through the scanning chirp field 22.1. For this purpose, the individual beams of different orders of diffraction, split at a point $P_I$, $P_{I'}$ of the scanning chirp field 22.1 arrive at points $P_{I,+1}$; $P_{I',+1}$; $P_{I,-1}$; $P_{I',-1}$ respectively of the scale chirp fields 23.1, 23.2, in each of which, to the extent possible, identical or at least similar local grid constants are present in order to achieve at least similar deflective effects. In connection with the points $P_{I,+1}$; $P_{I',+1}$; $P_{I,-1}$; $P_{I',-1}$ they will subsequently be referred to as conjugated positions of split beams. Consequently, at the stated conjugated positions must result the identical deflective effect for each of the various individual beams that were split at the same point $P_I$, $P_{I'}$ of the scanning chirp field 22.1. While this, as explained initially for small distance between the scale grating and scanning gratings, is to be ensured with the aid of a single scale chirp field whose graduation period only changes slowly, at least two separate scale chirp fields 23.1, 23.2 are provided according to the invention of greater sample distance between the scale grating and scanning gratings d. In the determination of the required position of the two scale chirp fields 23.1, 23.2 on the scale graduation carrier 23, the desired distance between the scale grating and scanning grating d must consequently be taken into account.

Preferably the interfering individual beams pass through equal optical path lengths between splitting and recombining. Thereby it is ensured that even possibly non-coherent light sources within a position-measuring device of this type could be used and an interference output signal for the determination of position made available. The local graduation periods at the points $P_I$ or $P_I'$ in the preferred embodiment shown are each twice as large as the corresponding local graduation periods at the conjugated points $P_{I,+1}$; $P_{I',+1}$; $P_{I,-1}$; $P_{I',-1}$. This produces symmetric angles of diffraction about an optical axis which is oriented perpendicularly to the scanning and scale graduation carriers. Due to the symmetric angle of diffraction, the optical path lengths passed through also remain approximately equal when small scanning gap changes between the scanning graduation carrier 22, 22' and the scale graduation carrier 23 occur.

With regard to the resulting path length changes in all individual beams resulting from a change of distance between the scale grating and scanning grating between the scale and scanning graduations, it must also be taken into account in connection with the chirped graduation structures for generating the reference pulse signals that all interfering individual beams experience the same phase shift to the extent possible.

In connection with the dimensioning of the various chirp fields 22.1, 23.1, 23.2 on the scanning and scale graduation carriers it must be taken into account along with the framework conditions explained above that in the non-shifted state of the scanning and scale graduation carriers, that is, in the zero position, the frequency components contributing to the total signal all have the same phase. The phase position of a frequency component can be changed thereby while the positions of bars in one or more chirp fields 22.1, 23.1, 23.2 are each easily shifted relative to one another at those points that are passed through by the individual beams corresponding to these frequency components can, for example, be done numerically.

If, for example, a reference pulse clock signal is to be generated, then one advantageously chooses for all frequency components the phase 0° so that a signal maximum for each frequency component occurs at the zero position. For a desired reference pulse counterclock signal, if necessary, one chooses on the contrary the phase position 180° for all frequency components so that a signal minimum results at the zero position.

In the general case, an arbitrary reference pulse signal defined in the vicinity of the desired zero position can be generated in that each frequency component of the desired signal is generated by corresponding sections of the appropriate chirp fields with an appropriate amplitude and phase position. While in this case the phase position, as explained above, can be selected by displacing the positions of the bars, the amplitude can be chosen by the suitable variation of bar width, deflection efficiency, or degree of transmission or reflection. It is particularly advantageous in this case to select the amplitude by a corresponding, location-dependent curve of the graduation periods of scale and scanning chirp fields.

This location-dependent curve of the graduation periods of the scale and scanning chirp fields can be described by so-called chirp functions. These specify by what amount, say, the n-th bar position deviates from a nominal position at which the bars would be disposed equidistantly, that is, with constant graduation period in the sample field. For the concrete dimensioning of the required chirp functions under the specified framework conditions reference is again made to U.S. Pat. No. 5,428,445.

In the preferred embodiment shown in FIGS. 1 and 2 merely a single detector element 25 is indicated schematically on the detector side. Also as in the prior-art triple grid transmitter disclosed in U.S. Pat. No. 4,776,701, registration of signals of interfering pairs of individual beams in different spatial directions can be provided in connection with the generation of reference pulse signals. For example, it has proven advantageous to use two detector elements that detect interference signals of defined phase shift in different spatial directions relative to the scanning graduation carrier 22. The respective phase shift between the signals present at both detector elements can be selected by the dimensioning of the scanning chirp fields 22.1. Thus the grid parameters of the scanning chirp fields 22.1 such as chirp function, bar width, and/or bar height can be chosen in such a way that a phase shift of 180° results between the signals registered in various spatial directions. Therewith a so-called counterclock signal is present for each reference pulse signal which is to be utilized advantageously on the evaluation side in order to generate an offset-free reference pulse signal by suitable connection of the two detector elements.

An additional capability for generating counterclock signals for the reference pulse signal consists of disposing a second scanning chirp field as well as two scale chirp fields laterally neighboring the aforementioned chirp fields with a definite offset and an additional detector element registering the corresponding interference signals. The corresponding chirp functions of the various chirp field arrangements are chosen in this case so that once a reference pulse clock signal and once reference pulse counterclock signal results, which can be evaluated subsequently according to the prior art.

Figure 3:
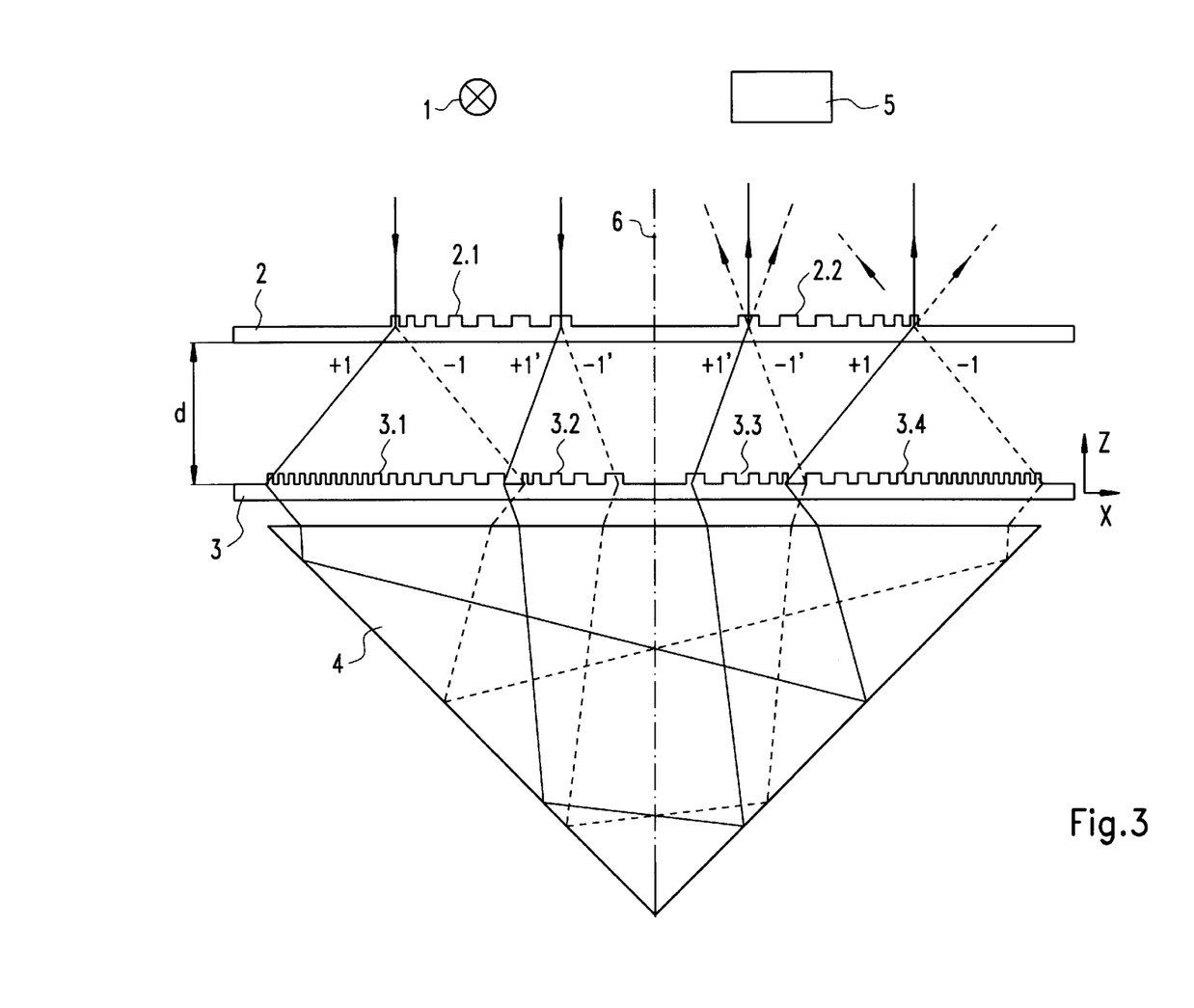
FIG. 3 is a schematic of a portion of a position-measuring device according to a second preferred embodiment of the present invention.
Figure 4:
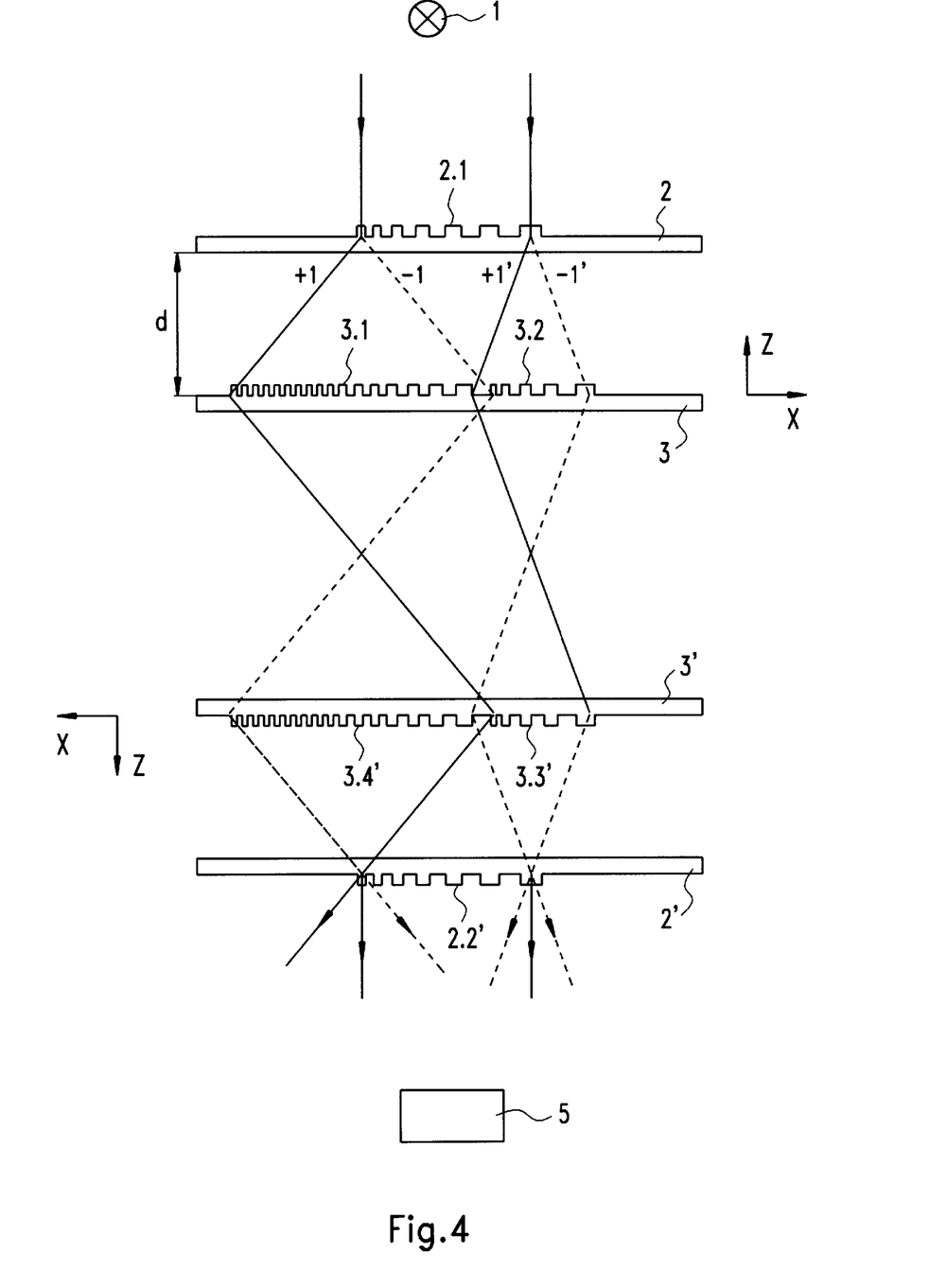
FIG. 4 illustrates the beam paths generated by the device shown in FIG. 3.
Figure 5:
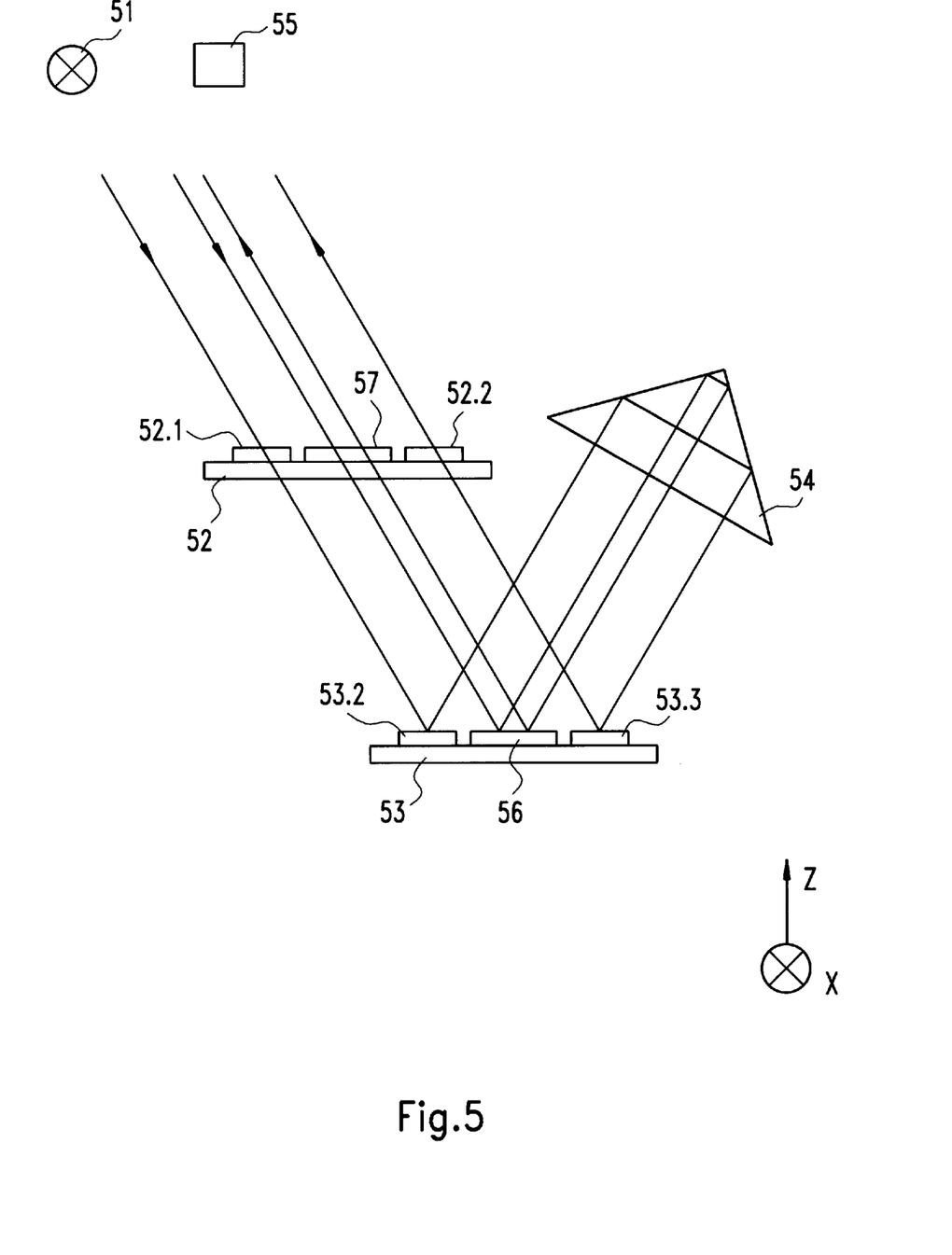
FIG. 5 is a schematic of a portion of a position-measuring device according to a third preferred embodiment of the present invention.

FIG. 3 is a schematic of a portion of a position-measuring device according to a preferred embodiment of the present invention. FIG. 4 illustrates the beam paths generated by the device shown in FIG. 3. FIG. 5 shows a possible spatial disposition of the individual components in a preferred embodiment.

The arrangement shown is based on the position-measuring device described in U.S. Pat. No. 5,079,418 which is specifically incorporated herein by reference and which has been modified to include the generation of high-resolution reference pulse signals according to the present invention. This position-measuring device distinguishes itself in particular by a high adjustment insensitivity or Moiré insensitivity also with regard to reference signal generation. Thus, a constant relation of the reference pulse signals to the incremental signals results in this embodiment corresponds to a so-called quadruple grid transmitter since the scale and scanning graduation carriers 2, 3 or the corresponding graduation structures, after the first pass and retroreflection by retroreflecting element 4 rigidly connected to the scanning graduation carrier 3, are passed four times in all before the interfering individual beams are registered by one or more detector elements 5. Shown therein is once again merely a single detector element 5. The phase-shifted modulated signals present at the detector element(s) 5 are processed further for determination of position according to prior art techniques.

In principle the same considerations apply in this preferred embodiment as in the previous embodiment. This means that the chirped grid structures used to generate high-resolution reference pulse signals must meet definite framework conditions and consequently a definite disposition of the same is the consequence. Thus it must also be ensured that at a desired greater sample distance between the scale grating and scanning grating d, the individual beams split at the input-side scanning chirp field 2.1 at a definite point with defined local graduation period are combined again at a point of the output-side scanning chirp field 2.2 that to the extent possible has the same local grid constant as the point of the split. In addition, a spatially separate disposition of two scale chirp fields 3.1, 3.2 on the scale graduation carrier 3 are also present. Thereby it is guaranteed that also at the desired greater sample distance between the scale grating and scanning grating d, the two individual beams, split into two orders of diffraction at one point on the incidence-side of scanning chirp field 2.1, strike areas of the two scale chirp fields 3.1, 3.2 in which also at least similar local grid constants are present. The individual beams are deflected into two orders of diffraction at the scanning chirp field 3.1, in the case of the chosen sample distance between the scale grating and scanning grating d, spatially separately from one another in the plane of the scale chirp fields 3.1, 3.2 and strike there the two spatially separated scale chirp fields 3.1, 3.2. In the representation of FIG. 3 this means that the diffracted individual beams of order +1 of the beam paths incident from the light source strike the left scale chirp field 3.1 while the individual beams of order −1 strike the right of the scale chirp fields 3.2 provided on the incidence side.

After the pass through scale chirp fields 3.1, 3.2, the various individual beams are reflected back once again into the direction of incidence with the aid of the retroreflecting element 4 that is rigidly connected to the scanning graduation carrier 3 and pass for a second time through scanning and scale graduation carriers 3.3, 3.4, 2.2. Entering and exiting beams are oriented parallel to one another in this case. Due to the chosen beam path on the exit side with chirp fields that are disposed spatially separately from the aforementioned incidence-side chirp fields. In order to insure that those at a point of splitting of the incidence-side scanning chirp field 2.1 with a defined local grid constant are also combined at a point of the exit-side scanning chirp field 2.2 with the same grid constant, definite symmetry conditions with regard to the disposition of the exit-side scale and scanning graduation carriers 3.3, 3.4, 2.2 must furthermore be adhered to.

In the case of a retroreflecting element 4 formed as a triple prism, the entrance-side and the exit-side scale and scanning chirp fields 2.1, 3.1, 3.2, 2.2, 3.3, 3.4 are disposed point-symmetrically about an axis 6 of a triple prism disposed on the respective graduation carriers, which runs through the peak of the triple prism and in the preferred embodiment shown is oriented perpendicularly to the entrance and exit face of the triple prism. This means that due to the required point symmetry of the two scale chirp fields 3.2 and 3.3, these have oppositely oriented chirp curve. Thus at the incidence-side chirp field 3.2 the graduation period increases from left to right while the graduation period at the exit-side chirp field 3.3 decreases from left to right. Analogous symmetry considerations apply as well as for the other chirp fields 3.1, 3.4, 2.1 and 2.2.

The retroreflecting element used has an axis of symmetry that results from the symmetry of the entering and exiting beams. Furthermore, the retroreflecting characteristic of this element is chosen in such a way that those beams that penetrate a scanning chirp field in common on the incidence side also pass the same exit-side scanning chirp field again.

While the arrangement shown in FIGS. 3 and 4 merely serves to explain the stated symmetry requirements, FIG. 5 show a view of a preferred embodiment of the optical position-measuring device according to the present invention with the corresponding relative arrangement of individual components. Shown therein is a view from the measuring apparatus, that is, the direction of measurement X is consequently oriented perpendicular to the plane of the drawing.

The scanning graduation 57 disposed on the scanning graduation carrier 52 for the generation of the incremental signals is then also clearly recognizable therein as well as the scale graduation 56 on the scale graduation carrier 53 scanned therewith. The scale graduation 56 as well as the scanning graduation 57 have constant graduation periods in the direction of measurement x. Laterally neighboring the scanning graduation 57, the entrance-side scanning chirp field 52.1 as well as the exit-side scanning chirp field 52.2 are disposed on the scanning graduation carrier 52. From the entrance-side scanning chirp field 52.1 the beams coming from the light source 51 are split into the various orders of diffraction perpendicularly to the plane of the drawing and arrive at the at least two incidence-side scale chirp fields 53.2, which are disposed in the X-direction neighboring one another due to which merely one is recognizable in the representation of FIG. 5. After the reflection in the direction of the retroflecting element 54 the individual beams for the generation of the reference pulse signals arrive at the exit-side scale chirp fields 52.3 also disposed in the X-direction neighboring one another of which once again only one is recognizable in the representation of FIG. 5. After the reflection in the direction of the exit-side scanning chirp field 52.2, the split individual beams are combined again and generate the phase-shifted modulated interference signals on the subsequently disposed detector element(s) 55.

Figure 6A:
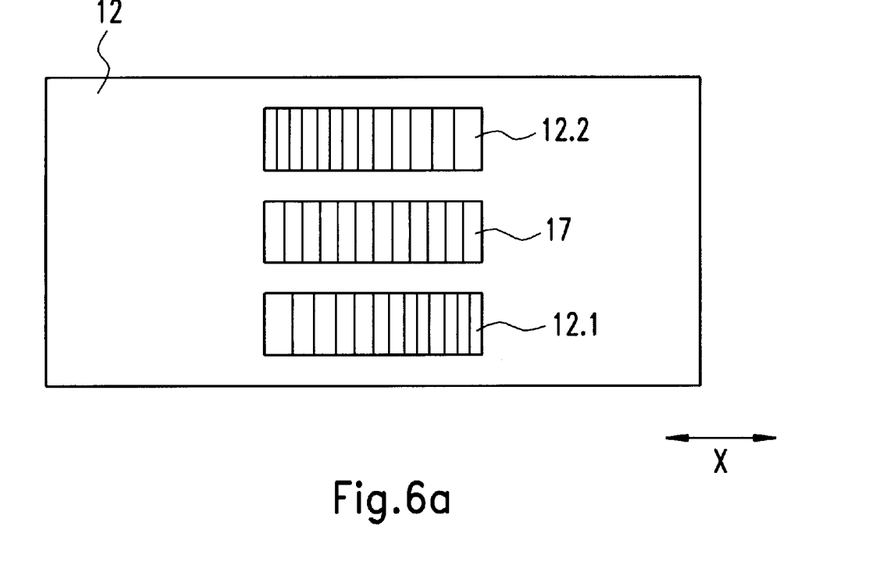
FIGS. 6a and 6b are top views of a scanning graduation carrier and a scale graduation carrier respectively according to a fourth preferred embodiment of the invention.
Figure 6B:
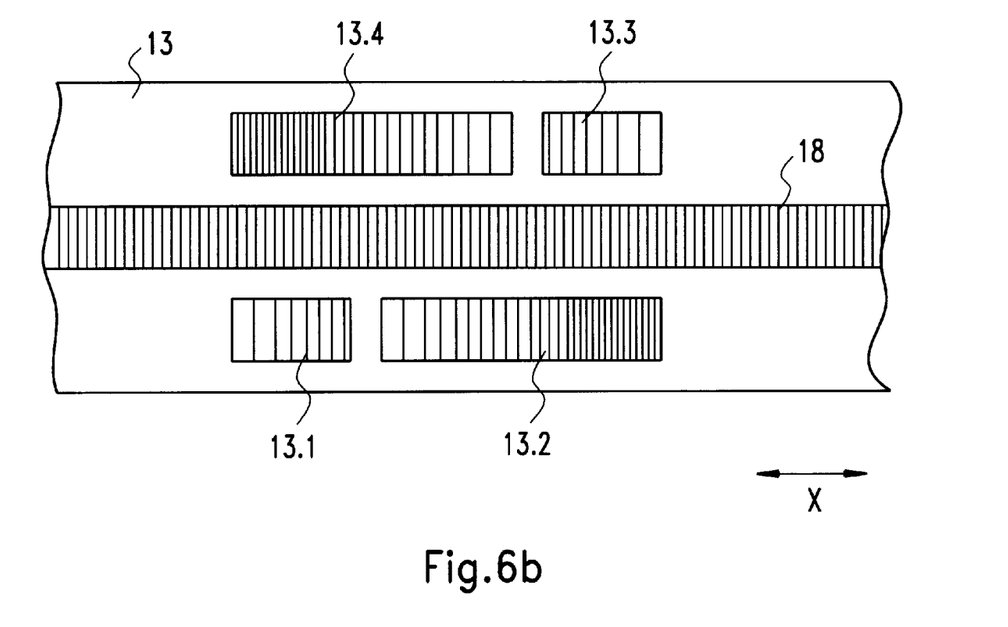

FIG. 6a shows a top view of a scanning graduation carrier 12 having a scanning graduation track 17 disposed in the middle by which the incremental signals are generated according to the prior art by scanning of the scale graduation shown in FIG. 6b. The scanning graduation 17 has, in the X-direction, a constant graduation period over the entire scanning field.

Laterally neighboring track 17 or perpendicular to the direction of measurement X, the two scanning chirp fields 12.1, 12.2 are disposed on the graduation carrier 12. The lower of the two scanning chirp fields 12.1 functions as an entrance-side scanning chirp field while the upper functions as an exit-side or detector-side scanning chirp field 12.2.

The scale graduation carrier 13 shown in FIG. 6b has in the middle a scale graduation track 18 by which, in cooperation with the track 17, incremental signals are generated. Laterally neighboring track 18 are two scale chirp fields 13.1, 13.2, 13.3, 13.4 which, in cooperation with the scanning chirp fields 12.1, 12.2, the generation of high-resolution reference pulse signals is possible as this was explained, with reference to FIGS. 4 and 5.

As also explained initially the chirp fields disposed along with the tracks 17, 18 have differently oriented chirp curves with which the stated symmetry conditions are maintained. While, for example, the graduation period of the upper scanning chirp field 12.2 becomes greater from left to right, for the lower scanning chirp field 12.1 the graduation period becomes smaller from left to right. That is the scanning chirp fields 12.1, 12.2 disposed about track 17 have an opposite chirp curve. For the scale chirp fields 13.1, 13.2, 13.3, 13.4, the orientation of the chirp curves on different sides of track 18 is oppositely oriented. On the contrary, identically aligned are the orientations of the chirp curves for the scale chirp fields 13.1, 13.2, 13.3, 13.4 on one side each of the scale graduation 18.

For the second possibility for generating counterclock reference pulse signals already mentioned in the first preferred embodiment, it would accordingly have to be provided two additional scanning chirp fields as well as four additional scale chirp fields in the direction of measurement X or offset perpendicularly thereto relative to the chirp fields shown. The chirp functions are to be chosen in this case so that a reference pulse clock signal and a reference pulse counterclock signal are generated.

In the preferred embodiments described it must be noted for each that the resolution or signal period of the generated reference pulse signal is adapted preferably to the resolution or signal period of the incremental signal. The resolution of the reference pulse signals is essentially determined by the average local grid constant of the scale chirp fields. In a preferred embodiment, the average local grid constant of the scale chirp fields corresponds approximately to 2.7 times the grid constant of the scale incremental graduation where as for the scale chirp fields the same local ratio of the signal periods for the grid constant is present as for the incremental graduation. Moreover the chirp functions of the various chirp fields are chosen according to the desired suppression of the near maximums of the resulting signal. Advantageously the greatest local graduation period is determined for this purpose greater than or equal to twice the average graduation. Likewise the smallest local graduation period should be less than or equal to $\frac{2}{3}$ of the average graduation period.

For the at least two scale chirp fields and their chirp functions it must further be noted that, as already mentioned, it must be ensured that, at that position of the scale graduation at which the reference pulse signal has its maximum, the individual beams of different orders of deflection interfering at the scanning chirp field each have equal optical path lengths. For this purpose, the local grid constants at the points of incidence of corresponding individual beams interfering with one another are preferably chosen identical on the two neighboring scale chirp fields 3.1 and 3.2.

In the preferred embodiments described so far a light source was either explicitly or indirectly provided with collimating optics to provide a collimated beam that strikes the first graduation structure disposed on the illumination side. It is, however, also possible to omit the separate collimation optics, so that, a light source that permits a non-collimated, for example, divergent beam to strike the scanning graduation carrier disposed on the illumination side. In the case of the preferred embodiment of FIGS. 1 and 2 the entrance-side scanning chirp field could then perhaps be set up so that the incident beams are split into the 0 and 1 orders of diffraction and subsequently strike the separate scale chirp field and so on. By the correspondingly chosen distribution or deflection effect of the entrance-side scanning chirp field collimation optics otherwise required can accordingly be spared. Between the various chirp fields the beam path of an illumination configuration of this type is identical to the beam path in the preferred embodiments explained.

Figure 7:
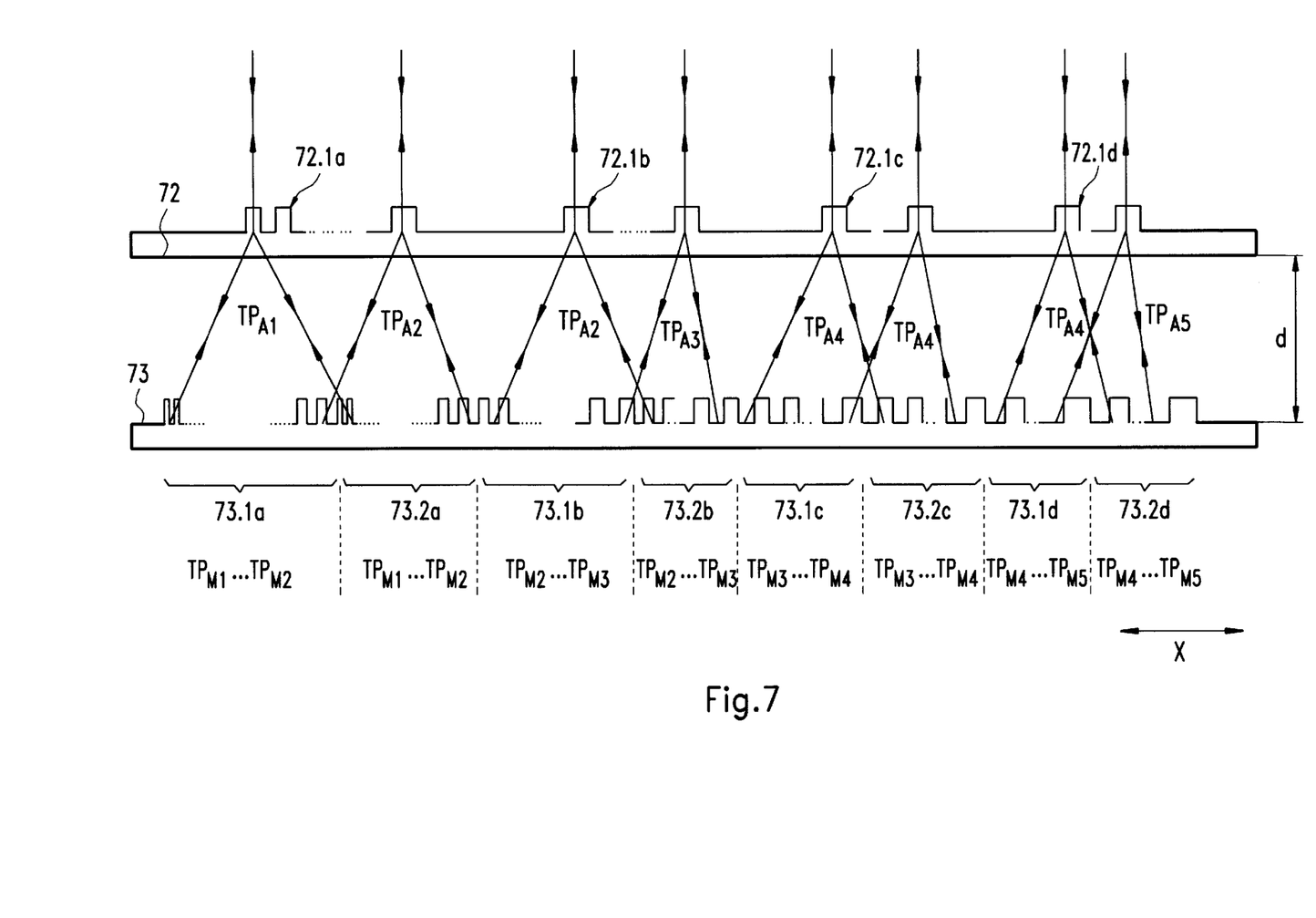
FIG. 7 is a schematic of a portion of a position-measuring device according to a fifth preferred embodiment of the present invention.

Another preferred embodiment of a portion of a position-measuring device according to the present invention is represented schematically in FIG. 7. This embodiment distinguishes itself in particular, by a greater insensitivity to distance between the scale grating and scanning grating. Thus it is required, say in the case of the customary distance between the scale grating and scanning grating conditions and at a predetermined form for the generated reference pulse signals in the preferred embodiments in FIG. 1, that the scanning chirp field 22.1 only has a slight spatial extension in the direction of measurement X in order to guarantee as complete a separation as possible of the individual beams in the two scanning chirp fields 23.1, 23.2. The graduation periods consequently vary sharply whereby locally sharply varying diffraction effects for the incident individual beams also result. In a variation of the scanning gap d during the measurement, the case can thus occur that the individual beams of an order of deflection of the scale chirp field 23.1, 23.2 are not recombined as required at the same point on the scanning chirp field 22.1 and arrive at interference. The individual beams coming from the scale chirp field 23.1, 23.2 can rather arrive at areas of the scanning chirp field that indeed lie near one another but have sharply different graduation periods and therewith cause a diffraction in different spatial directions. That means that the prerequisites required for interference and therewith for generation of the reference pulse signal are no longer met in this case.

In order to achieve a greater distance between the scale grating and scanning grating insensitivity in the measurement of position under these conditions, it is provided in the preferred embodiment of FIG. 7 that several partial scanning chirp fields 72.1a, 72.1b, 72.1c, 72.1d are disposed on sides of the scanning graduation carrier 72 displaced from one another in the direction of measurement X. A distribution of the originally only one scanning chirp field into various partial scanning chirp fields is finally accomplished thereby. The graduation periods $TP_{An}$ (n=1, . . . , 5 in the preferred embodiment) of the various partial scanning chirp fields 72.1a, 72.1b, 72.1c, 72.1d vary thereby in the manner indicated in FIG. 7. Thus it is provided that the graduation periods $TP_{An}$ at the edges of partial scanning chirp fields 72.1a, 72.1b, 72.1c, 72.1d bordering one another are identical according to the required chirp curve or at least lie in similar orders of magnitude. Within the respective partial scanning chirp fields 72.1a, 72.1b, 72.1c, 72.1d a definite chirp curve relative to the graduation is provided so that in the combination of all partial scanning chirp fields 72.1a, 72.1b, 72.1c, 72.1d the desired continuous chirp curves results overall. To each of the four partial scanning chirp fields 72.1a, 72.1b, 72.1c, 72.1d shown two scale chirp fields each are assigned on the side of the scale graduation carrier, that is, in this preferred embodiment in all eight partial scanning chirp fields 73.1a, 73.2a, 73.1b, 73.2b, 73.1c, 73.2c, 73.1d, 73.2d are required. With reference to the graduation period $T_{Mn}$ in the individual partial scale chirp field let us refer to the schematic representation of FIG. 7. This shows, however, in no way a reproduction to scale of the graduation period ratios.

For each partial system consisting of a partial scanning chirp field as well as the two partial scale chirp field assigned to each, the same considerations apply in principle with regard to the dimensioning of the respective chirp curve or the arrangement on the respective graduation carrier as in the previous preferred embodiments. To these, i.e., belong that the graduation periods $TP_{An}$ on the sides of the partial scanning chirp fields 72.1a, 72.1b, 72.1c, 72.1d are preferably chosen twice as large as the graduation period $TP_{Mn}$ on the sides of the partial scale chirp fields 73.1a, 73.2a, 73.1b, 73.2b, 73.1c, 73.2c, 73.1d, 73.2d. Analogously to the example mentioned above the equation $TP_{An}=2\times TP_{Mn}$ applies.

In this preferred embodiment not so great changes of the graduation period $TP_{An}$ within smaller areas are required on the sides of the partial scanning chirp fields 72.1a, 72.1b, 72.1c, 72.1d, that is, a chirp curve relative to the graduation periods $TP_{An}$ is provided in which the graduation periods $TP_{An}$ of neighboring areas differ only negligibly. Therewith it is guaranteed, even with, if necessary, varying sample distance between the scale grating and scanning grating d that the individual beams coming from each of the partial scale chirp fields 73.1a, 73.2a, 73.1b, 73.2b, 73.1c, 73.2c, 73.1d, 73.2d arrive at areas of the partial scanning chirp fields 72.1a, 72.1b, 72.1c, 72.1d that have only slight differences in their graduation periods $TP_{An}$ and thus can also interfere.

Of course the various individual measures explained based on the preferred embodiments can also be combined in connection with this form of embodiment of the inventive optical position-measuring device.

The optical position-measuring device according to the preferred embodiments can moreover be formed as an angle-measuring as well as a length-measuring system. Furthermore, transmitted light variations can likewise be realized like incident light variations.

As is clear from the preceding description of various preferred embodiments, a series of possibilities such as the inventive generation of high-resolution reference signal pulses at greater distance between the scale grating and scanning gratings in interferential measuring system can be realized.

What is claimed is:

1. A position-measuring device for the determination of the relative position of two objects movable with respect to one another the device comprising:

at least two graduation carriers connected to the movable objects at a defined distance between the scale grating and scanning grating d that serve as scale and scanning graduation carriers;

reference mark graduation structures that serve to generate a defined signal at a known absolute position with at least one assigned to the scanning graduation carrier and at least two assigned to the scale graduation carrier whereby the reference mark graduation structures assigned to the scanning graduation carrier as well as those assigned to the scale graduation carrier are formed as chirp fields with a grid graduation with continuously variable graduation period and, by the scanning chirp field assigned to the scanning graduation carrier, the incident beams of a light source disposed on the illumination side can be split into at least two individual beams of different order of diffraction and the at least two scale chirp fields disposed on the scale graduation carrier interact with one of the two individual beams and are disposed spatially separated at the chosen distance between the scale grating and scanning grating (d) so that the at least two individual beams of different order of diffraction strike areas in the separated scale chirp fields with at least similar local graduation periods insuring a recombination of these individual beams at essentially the same point in the scanning chirp field is possible and the resulting interfering pair of individual beams can be registered by means of at least one detector element.

2. A position-measuring device according to claim 1 wherein two scale chirp fields are disposed neighboring one another in the direction of the relative motion of the two movable objects on the scale graduation carrier.

3. A position-measuring device according to claim 1 wherein the local grid parameters of the scanning chirp field is dimensioned so that on the detector side at least two signals with different signal shape can be generated.

4. A position-measuring device according to claim 2 wherein at least one additional scanning chirp field as well as at least two additional scale chirp fields are disposed on the scanning and scale graduation carriers with a defined offset to the aforementioned scanning chirp field as well as to the at least two additional scale chirp field and at least one additional detector element is assigned to the additional scanning and scale chirp fields by which an additional reference pulse signal with a different signal shape can be registered.

5. A position-measuring device according to claim 3 wherein the at least two signals form a reference pulse clock signal as well as reference pulse counterclock signal.

6. A position-measuring device according to claim 1 wherein the chirp curve of the various shape field is chosen from one-dimensional, continuous, monotonically increasing or continuous, monotonically decreasing functions.

7. A position-measuring device according to claim 1 wherein the at least two scale chirp fields have an average local grid constant that corresponds to 2.7 times the grid constant of a standard incremental graduation.

8. A position-measuring device according to claim 1 wherein the local grid constant of the scale chirp field at the point of incidence of individual beams interfering with one another correspond to half the grid constant of the point of split on the assigned scanning chirp field.

9. A position-measuring device according to claim 1 further comprising a retroreflecting optical element that is passed through after the initial pass of the graduation structures assigned to the scanning graduation carrier and that is dimensioned in such a way that the individual beams leaving the retroreflecting element or additional standard and scanning graduation structures run through another time and interfere with one another after the final exit-side graduation structure.

10. A position-measuring device according to claim 9 wherein the scanning chirp fields and the scale chirp fields are each disposed laterally neighboring a scanning graduation and a scale graduation on the scanning graduation carrier and the scale graduation carrier.

11. A position-measuring device according to claim 10 wherein
on the scanning graduation carrier laterally neighboring a scanning graduation for the generation of incremental signals, at least one scanning chirp field each is disposed and these scanning chirp fields have directions of their chirp shapes that are oriented oppositely to one another and
on the scale graduation carrier laterally neighboring a scale graduation for the generation of incremental signals, two scale chirp fields each are disposed whereby on each side the scale chirp fields have equally oriented directions of the chirp shape but the directions of the chirp shape of the scale chirp fields oppositely disposed are oriented oppositely to one another.

12. A position-measuring device according to claim 9 wherein the retroreflecting optical element is formed as a triple prism.

13. A position-measuring device according to claim 9 wherein observed from the illumination-side direction, includes a transparent scanning graduation carrier and a transparent scale graduation carrier.

14. A position-measuring device according to claim 9 wherein observed from the illumination-side direction, includes a transparent scanning graduation carrier as well as a reflecting scale graduation carrier and the retroreflecting optical element is disposed on the side of the scale graduation carrier that is turned toward the light source.

15. A position-measuring device according to claim 12 wherein the entrance-side and the exit-side scanning and scale chirp fields are disposed point-symmetrically to an axis of the triple prism on the respective graduation carriers and the axis runs through the peak of the triple prism and is oriented essentially perpendicularly to the entrance and exit face of the triple prism.

16. A position-measuring device according to claim 1 wherein on the scanning graduation carrier several partial scanning chirp fields are disposed on sides of the scanning graduation carrier displaced from one another in the direction of measurement X and on the scale graduation carrier so each partial scanning chirp field is assigned partial scale chirp fields that are disposed neighboring one another in the direction of measurement X.

\* \* \* \* \*

UNITED STATES PATENT AND TRADEMARK OFFICE
CERTIFICATE OF CORRECTION

PATENT NO. : 5,977,539
DATED : November 2, 1999
INVENTOR(S) : Wolfgang Holzapfel et al.

It is certified that error appears in the above-identified patent and that said Letters Patent is hereby corrected as shown below:

In claim 1, line 6, delete "grating d" and substitute --grating (d)-- in its place.

In claim 1, line 20, immediately after "diffraction" insert --;-- (semicolon).

In claim 11, line 8, immediately after "another" insert --;-- (semicolon).

Signed and Sealed this

Twenty-second Day of May, 2001

Attest:

NICHOLAS P. GODICI

Attesting Officer

Acting Director of the United States Patent and Trademark Office